(12) United States Patent
Ge (10) Patent No.: US 9,384,110 B2
(45) Date of Patent: *Jul. 5, 2016

(54) METHOD, COMPUTER SYSTEM, AND APPARATUS FOR ACCESSING PERIPHERAL COMPONENT INTERCONNECT EXPRESS ENDPOINT DEVICE

(71) Applicant: Huawei Technologies Co., Ltd., Shenzhen, Guangdong (CN)

(72) Inventor: Xiaoyu Ge, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 274 days.

This patent is subject to a terminal disclaimer.

(21) Appl. No.: 14/141,154

(22) Filed: Dec. 26, 2013

(65) Prior Publication Data

US 2014/0344632 A1  Nov. 20, 2014

Related U.S. Application Data

(63) Continuation of application No. PCT/CN2013/075920, filed on May 20, 2013.

(51) Int. Cl.
| | |
|---|---|
| *G06F 11/30* | (2006.01) |
| *G06F 13/10* | (2006.01) |
| *G06F 13/42* | (2006.01) |
| *G06F 11/00* | (2006.01) |

(52) U.S. Cl.
CPC .......... *G06F 11/3041* (2013.01); *G06F 11/004* (2013.01); *G06F 11/3027* (2013.01); *G06F 11/3055* (2013.01); *G06F 13/105* (2013.01); *G06F 13/4221* (2013.01); *G06F 11/3089* (2013.01); *G06F 2213/0026* (2013.01); *G06F 2213/4004* (2013.01)

(58) Field of Classification Search
CPC .................................................. G06F 11/3041
See application file for complete search history.

(56) References Cited

U.S. PATENT DOCUMENTS

| | | | | |
|---|---|---|---|---|
| 5,337,413 | A | * | 8/1994 | Lui et al. ........................... 710/2 |
| 5,594,875 | A | * | 1/1997 | Thaller ......................... 710/107 |
| 5,666,559 | A | * | 9/1997 | Wisor et al. ..................... 710/32 |
| 6,070,207 | A | | 5/2000 | Bell et al. |
| 6,463,554 | B1 | * | 10/2002 | Budelman et al. ........... 714/47.1 |

(Continued)

FOREIGN PATENT DOCUMENTS

| | | |
|---|---|---|
| CN | 101034380 A | 9/2007 |
| CN | 101996146 A | 3/2011 |

(Continued)

*Primary Examiner* — Albert Decady
*Assistant Examiner* — Paul Contino
(74) *Attorney, Agent, or Firm* — Huawei Technologies Co., Ltd.

(57) ABSTRACT

Embodiments of the present invention relate to a peripheral component interconnect express endpoint device accessing method, a computer system, and an apparatus. A state of an access request sent by a processor is monitored, and a simulation response message for the access request is sent to the processor when it is determined that the PCIe endpoint device sends no response message for the access request. Therefore, according to the simulation response message, the processor can confirm completion of the procedure corresponding to the previously sent access request, and shut down a timer for timing the access request and clear the buffered access request, thereby keeping normal processing in the processor and avoiding the MCE resetting problem that arises from accumulation of access requests in the processor.

11 Claims, 7 Drawing Sheets

(56) References Cited

U.S. PATENT DOCUMENTS

| | | | |
|---|---|---|---|
| 6,691,191 B1* | 2/2004 | Kobayashi et al. | 710/107 |
| 7,552,362 B2* | 6/2009 | Fukui et al. | 714/44 |
| 2002/0040422 A1 | 4/2002 | Harris et al. | |
| 2003/0115380 A1 | 6/2003 | Ajanovic et al. | |
| 2004/0143776 A1 | 7/2004 | Cox et al. | |
| 2005/0053057 A1* | 3/2005 | Deneroff et al. | 370/360 |
| 2007/0033314 A1 | 2/2007 | Rostampour et al. | |
| 2007/0088987 A1* | 4/2007 | Kimizuka et al. | 714/42 |
| 2007/0220179 A1* | 9/2007 | Hanaoka et al. | 710/6 |
| 2008/0005377 A1* | 1/2008 | Lambert et al. | 710/15 |
| 2008/0082866 A1* | 4/2008 | Li | 714/43 |
| 2009/0254692 A1 | 10/2009 | Feehrer et al. | |
| 2010/0153602 A1 | 6/2010 | Kume et al. | |
| 2010/0169068 A1 | 7/2010 | Kuya et al. | |
| 2012/0047306 A1 | 2/2012 | Mitsubayashi | |
| 2012/0072633 A1 | 3/2012 | Elboim | |
| 2012/0072637 A1 | 3/2012 | Oohira | |
| 2012/0079312 A1 | 3/2012 | Muthrasanallur et al. | |
| 2012/0317328 A1* | 12/2012 | Rankin et al. | 710/308 |
| 2013/0060987 A1* | 3/2013 | Bolen et al. | 710/316 |

FOREIGN PATENT DOCUMENTS

| | | |
|---|---|---|
| CN | 102023941 A | 4/2011 |
| CN | 102193799 A | 9/2011 |
| CN | 102662903 A | 9/2012 |
| JP | 2083649 A | 3/1990 |
| JP | 2003288278 A | 10/2003 |
| JP | 2010055474 A | 3/2010 |
| JP | 2012043171 A | 3/2012 |
| JP | 2012063971 A | 3/2012 |
| JP | 2013097420 A | 5/2013 |

* cited by examiner

METHOD, COMPUTER SYSTEM, AND APPARATUS FOR ACCESSING PERIPHERAL COMPONENT INTERCONNECT EXPRESS ENDPOINT DEVICE

CROSS-REFERENCE TO RELATED APPLICATIONS

This application is a continuation of International Patent Application No. PCT/CN2013/075920, filed on May 20, 2013, which is hereby incorporated by reference in its entirety.

TECHNICAL FIELD

The present Invention relate to computer technologies, and in particular, to a method, a computer system, and an apparatus for accessing a Peripheral Component Interconnect Express PCIe endpoint device.

BACKGROUND

Peripheral component interconnect express (Peripheral Component Interconnect Express, PCIe) is a high-performance system bus used on a computing and communication platform. The PCIe bus is widely applied in a system interconnected where a CPU and peripheral devices are interconnected, and serves as a core service channel in computing and storage devices. There are many types of peripheral devices interconnected with the CPU through a PCIe bus, such as a network adapter device or a solid state disk (Solid State Disk, SSD). Such devices are herein called PCIe endpoint devices uniformly.

The PCIe bus is widely applied as a bus interface of a server or a storage system. When the system runs normally, as required by online expansion and maintenance, PCIe endpoint devices need to be added or removed with power uninterrupted, which is known as hot-swapping. In the prior art, PCIe hot-swapping conforms to the following procedures: An operator sends a hot-swap request by pressing a button; a hot-swap controller knows a hot-swap event, and then notifies all drivers that will possibly access the PCIe endpoint device in the system to stop accessing the PCIe endpoint device, and offloads resources of the PCIe endpoint device that needs to be hot-swapped; and then the PCIe endpoint device is powered off, and the operator unplugs the PCIe endpoint device.

In the prior art, hot-swapping of the PCIe endpoint device requires notification in advance in order to ensure normal running of the system. However, in recent years, the PCIe bus evolves from intra-system interconnection into inter-system interconnection, peripherals such as external cables are being increasingly applied, the cables tend to drop abnormally, and the PCIe endpoint device may get offline abnormally without notification in advance. In addition, it is more and more common for a user to use a solid state disk SSD to directly access the system. For reasons such as user habits, the user may directly plug or unplug an SSD disk without a prior notification. However, for the afore-mentioned situation where the PCIe endpoint device gets offline suddenly and abnormally, if the CPU has sent an instruction of reading or writing the PCIe endpoint device, the relevant instruction will be always in a to-be-executed state; when instructions sent by the CPU for accessing the PCIe endpoint device accumulates to some extent, the CPU considers the entire system abnormal, and reports a machine check exception (Machine check exception, MCE) error and performs a resetting.

SUMMARY

Embodiments of the present invention provide a method, a computer system, and an apparatus for accessing a Peripheral Component Interconnect Express PCIe endpoint device to prevent CPU resetting after a PCIe endpoint device gets offline abnormally.

In a first aspect, an embodiment of the present invention provides a computer system, including:
a processor; and
a peripheral component interconnect express PCIe bus, configured to connect to a PCIe endpoint device, where
the processor is configured to obtain an operation instruction for accessing the PCIe endpoint device, and send an access request to the PCIe endpoint device according to the operation instruction; and
the computer system further includes a simulation response module, configured to: after the processor sends the access request to the PCIe endpoint device, monitor a message state of the access request, determine the message state of the access request when a preset trigger condition is fulfilled, and if the message state of the access request is "unfinished", obtain a simulation response message for the access request, and send the simulation response message to the processor, where
the message state of the access request includes "finished" or "unfinished", where "unfinished" indicates that the PCIe endpoint device sends no response message for the access request.

With reference to the first aspect, in a first possible implementation manner, the simulation response module is set in a signal transmission path between the processor and the PCIe endpoint device, and is specifically configured to receive an access request sent by the processor, forward the access request to the PCIe endpoint device, monitor whether a response message for the access request is received from the PCIe endpoint device, and if a response message for the access request is received from the PCIe endpoint device, record the message state of the access request as "finished".

With reference to the first aspect or the first possible implementation manner of the first aspect, in a second possible implementation manner, the computer system further includes: a PCIe switch, configured to connect to multiple PCIe endpoint devices to the processor, where a downstream port of the PCIe switch is connected to the multiple PCIe endpoint devices through the PCIe bus; and
a port of the simulation response module is connected to an upstream port of the PCIe switch through the PCIe bus, and another port of the simulation response module is connected to the processor.

With reference to the first aspect or the first possible implementation manner of the first aspect or the second possible implementation manner of the first aspect, in a third possible implementation manner, the simulation response message for the access request includes a first type simulation response message or a second type simulation response message, where the first type simulation response message indicates that the PCIe endpoint device does not support the access request, and the second type simulation response message indicates that the PCIe endpoint device is abnormal; and
the processor is further configured to abort subsequent access to the PCIe endpoint device according to the first type simulation response message or the second type simulation response message.

With reference to the first aspect or the first possible implementation manner of the first aspect or the second possible implementation manner of the first aspect, in a fourth possible implementation manner, the preset trigger condition is that the PCIe endpoint device goes offline abnormally; and correspondingly, the simulation response module is further configured to monitor whether the PCIe endpoint device goes offline abnormally, and determine the message state of the access request when it is determined that the PCIe endpoint device goes offline abnormally.

With reference to the first aspect or the first possible implementation manner of the first aspect or the second possible implementation manner of the first aspect, in a fifth possible implementation manner, the preset trigger condition is that of a timer of the access request times out; and correspondingly, the simulation response module is further configured to start a timer to perform timing for the access request sent by the processor, and upon timeout of the timer, determine the message state of the access request.

In a second aspect, a peripheral component interconnect express PCIe endpoint device accessing method is further provided, where a PCIe endpoint device accesses a computer system through a PCIe bus, and the method includes:

monitoring a message state of an access request after a processor in the computer system sends the access request to the PCIe endpoint device, where the message state of the access request includes "finished" or "unfinished", where "unfinished" indicates that the PCIe endpoint device sends no response message for the access request;

determining the message state of the access request when a preset trigger condition is fulfilled;

obtaining a simulation response message for the access request if the message state of the access request is "unfinished"; and sending the simulation response message for the access request to the processor.

With reference to the second aspect, in a first possible implementation manner, the method further includes:

receiving the access request sent by the processor, and forwarding the access request to the PCIe endpoint device; and the monitoring the message state of the access request includes:

monitoring whether a response message for the access request is received from the PCIe endpoint device, and if a response message for the access request is received from the PCIe endpoint device, recording the message state of the access request as "finished".

With reference to the second aspect or the first possible implementation manner of the second aspect, in a second possible implementation manner, the preset trigger condition is that the PCIe endpoint device goes offline abnormally; and the method further includes:

monitoring whether the PCIe endpoint device goes offline abnormally, and when it is determined that the PCIe endpoint device goes offline abnormally, performing the step of determining the message state of the access request.

With reference to the second aspect or the first possible implementation manner of the second aspect, in a third possible implementation manner, the preset trigger condition is timeout of a timer of the access request; and the method further includes:

starting a timer to time the access request sent by the processor, and upon timeout of the timer, performing the step of determining the message state of the access request.

In a third aspect, a simulation response apparatus, applied in a computer system, is provided, where a peripheral component interconnect express PCIe endpoint device accesses the computer system through a PCIe bus, and the apparatus includes:

a monitoring unit, configured to monitor a message state of an access request after a processor in the computer system sends the access request to the PCIe endpoint device, where the message state of the access request includes "finished" or "unfinished", where "unfinished" indicates that the PCIe endpoint device sends no response message for the access request;

a determining unit, configured to determine the message state of the access request according to a monitoring result of the monitoring unit when a preset trigger condition is fulfilled;

an obtaining unit, configured to obtain a simulation response message for the access request if the determining unit determines that the message state of the access request is "unfinished"; and a responding unit, configured to send the simulation response message obtained by the obtaining unit to the processor.

With reference to the first possible implementation manner of the third aspect, in a second possible implementation manner, the apparatus further includes an interacting unit, configured to receive an access request sent by the processor, and forward the access request to the PCIe endpoint device; and the monitoring unit is specifically configured to monitor whether the interacting unit receives a response message for the access request sent by the PCIe endpoint device, and if a response message for the access request is received from the PCIe endpoint device, record the message state of the access request as "finished".

In a fourth aspect, a computer is provided, including a processor, a memory, a bus, and a communication interface, where the memory is configured to store computer-executable instructions, and the processor is connected to the memory through the bus; and when the computer runs, the processor executes the computer-executable instructions stored in the memory, so that the computer executes the peripheral component interconnect express PCIe endpoint device accessing method provided in the second aspect.

In a fifth aspect, a computer-readable medium is provided, including computer-executable instructions, where when a processor of a computer executes the computer-executable instructions, the computer executes the peripheral component interconnect express PCIe endpoint device accessing method provided in the second aspect.

In the embodiments of the present invention, the message state of the access request sent by the processor can be monitored, and the simulation response message for the access request is sent to the processor when it is determined that the PCIe endpoint device sends no response message for the access request. Therefore, according to the simulation response message, the processor can confirm completion of the procedure corresponding to the previously sent access request, and shut down the timer for timing the access request and clear the buffered access request, thereby keeping normal processing in the processor and avoiding the MCE resetting problem that arises from accumulation of access requests in the processor.

BRIEF DESCRIPTION OF DRAWINGS

To illustrate the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention provide a method, a computer system, and an apparatus for accessing a Peripheral Component Interconnect Express PCIe endpoint device, so that when the PCIe endpoint device needs to be hot-swapped, a connection between a PCIe endpoint device and a processor is cut off directly, without notifying the system beforehand to perform preprocessing, and in this case, the processor does not suffer the risk of MCE resetting.

In the embodiments of the present invention, situations where a PCIe endpoint device is unplugged out of the system directly or offline due to a fault are uniformly called abnormal offline of the PCIe endpoint device.

System Architecture of the Embodiments of the Present Invention

Figure 1:
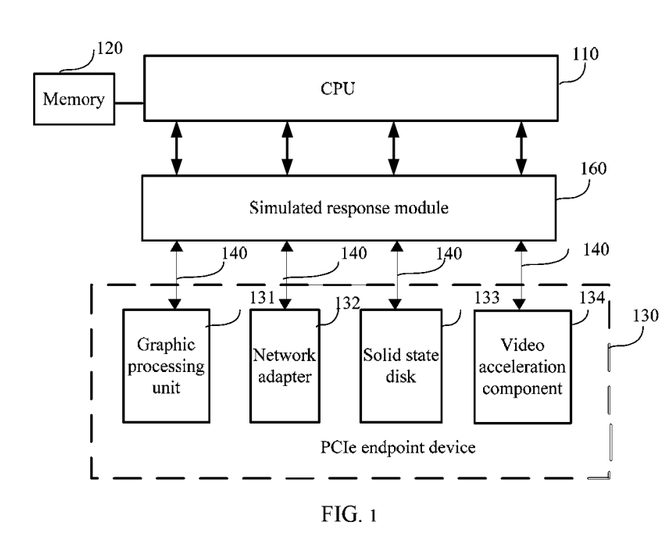
FIG. 1 is a composition diagram of a computer system according to an embodiment of the present invention.

FIG. 1 is a composition diagram of a computer system according to an embodiment of the present invention. The computer system illustrated in FIG. 1 includes a CPU 110 and a memory 120. A PCIe endpoint device 130 is connected to the CPU 110 through a PCIe bus 140, and can be plugged into or unplugged out of the computer system. The PCIe endpoint device 130 may be of various types, such as a graphic processing unit 131, a network adapter 132, a solid state disk 133, and a video acceleration component 134.

In the computer system illustrated in FIG. 1, the PCIe endpoint device 130 and the CPU 110 make up a PCIe domain, and all devices in the PCIe domain are connected to the CPU 110 through the PCIe bus 140 and controlled by the CPU 110.

After obtaining an operation instruction for accessing the PCIe endpoint device 130, the CPU 110 sends an access request to the PCIe endpoint device 130 according to the operation instruction, requesting to perform a read operation or a write operation on a register of the PCIe endpoint device 130. If the PCIe endpoint device 130 goes offline abnormally, the CPU 110 will fail to receive a response message for the access request of the CPU 110 from the PCIe endpoint device 130. In this case, the CPU considers the access request an unfinished task. If such unfinished tasks accumulate in the CPU to some extent, the CPU considers the entire system abnormal, and reports an MCE error and is reset.

In the embodiment of the present invention, a simulation response module 160 is added in the system. The simulation response module 160 is configured to: after the CPU 110 sends the access request to the PCIe endpoint device 130, monitor a message state of the access request sent by the CPU 110; when a preset trigger condition is fulfilled, if the message state of the access request is still "unfinished", that is, if the PCIe endpoint device 130 sends no response message for the access request, the simulation response module 160 obtains a simulation response message for the access request and sends the simulation response message to the CPU 110. The simulation response message and the access request have the same message header, and the access request and the simulation response message correspond to each other. Therefore, the CPU considers the procedure corresponding to the previously sent access request as finished, shuts down a timer for timing the access request, and clears the access request buffered by the CPU.

The message state of the access request includes "finished" or "unfinished", where "finished" indicates that the PCIe endpoint device has sent a response message for the access request, and "unfinished" indicates that the PCIe endpoint device sends no response message for the access request.

In addition, the simulation response module 160 is further configured to: after the processor sends the access request to the PCIe endpoint device, generate a simulation response message for the access request, and buffer the simulation response message for the access request. Subsequently, the simulation response module 160 obtains the locally buffered simulation response message for the access request directly.

In the embodiment of the present invention, the simulation response module can monitor the message state of the access request sent by the CPU, and send the simulation response message for the access request to the CPU when determining that the PCIe endpoint device sends no response message for the access request. Therefore, according to the simulation response message, the CPU can confirm completion of the procedure corresponding to the previously sent access request, and shut down the timer for timing the access request and clear the buffered access request, thereby keeping normal processing in the CPU and avoiding the MCE resetting problem that arises from accumulation of access requests in the CPU.

In a specific implementation manner of the present invention, the simulation response module 160 may monitor the message state of the access request by monitoring whether a response message for the access request is received from the PCIe endpoint device 130, and message if the simulation response module receives a response message for the access request from the PCIe endpoint device, the simulation response module records the message state of the access request as "finished".

In a specific embodiment of the present invention, the simulation response module 160 may be set in a transmission path between the CPU 110 and each PCIe endpoint device 130 to ensure that all messages between the CPU 110 and each PCIe endpoint device 130 pass through the simulation response module 160. In this way, the simulation response module 160 may monitor the message state of the access request by monitoring whether a response message for the access request is received from the PCIe endpoint device 130. In another implementation manner, a pre-configuration may be performed on the PCIe endpoint device 130, so that when sending the response message to the CPU 110, the PCIe endpoint device 130 also sends the response message for the access request to the simulation response module. In this way, the simulation response module 160 can also monitor the message state of the access request according to whether a response message for the access request is received. Definitely, based on the implementation manners provided in the embodiments of the present invention, a person skilled in the art can use other equivalent or similar implementation manners to enable the simulation response module 160 to monitor the message state of the access request.

As illustrated in FIG. 1, the simulation response module 160 is set in a signal transmission path between the CPU 110 and each PCIe endpoint device 130. In this way, the access request sent by the CPU 110 needs to pass through the simulation response module 160 before arriving at the PCIe endpoint device 130. Therefore, the simulation response module 160 may receive the access request, and because the message sent by the PCIe endpoint device needs to pass through the simulation response module 160 before arriving at the CPU 110, the simulation response module 160 may determine, according to whether the response message for the access request is received from the PCIe endpoint device 130, whether the PCIe endpoint device 130 has sent the response message for the access request, and record the message state of the access request. Further, in another specific implementation manner of the embodiment of the present invention, after receiving the access request sent by the CPU 110, the simulation response module 160 may further buffer the access request. If the response message for the access request is received from the PCIe endpoint device 130 subsequently, the simulation response module 160 may affix a "finished" flag to the buffered access request, or delete the buffered access request. When the preset trigger condition is fulfilled, the simulation response module 160 may query the message state of the access request, that is, query a flag of the buffered access request or query the buffered access request. If the flag of the access request indicates that the access request is "unfinished" or if the buffered access request is not deleted, the simulation response module 160 determines that the message state of the access request is "unfinished", that is, the PCIe endpoint device 130 sends no response message for the access request. Therefore, the simulation response module 160 obtains the simulation response message for the access request, and sends the simulation response message to the CPU 110.

When receiving the access request sent by the CPU 110, the simulation response module 160 may generate the simulation response message for the access request beforehand, and buffer the generated simulation response message for the access request in association with the access request. Subsequently, the simulation response module 160 obtains the buffered simulation response message for the access request directly. Definitely, the simulation response module 160 may not generate the simulation response message for the access request until it is determined that no response message for the access request is received from the PCIe endpoint device 130. The embodiment of the present invention does not limit the specific implementation manner.

Figure 2:
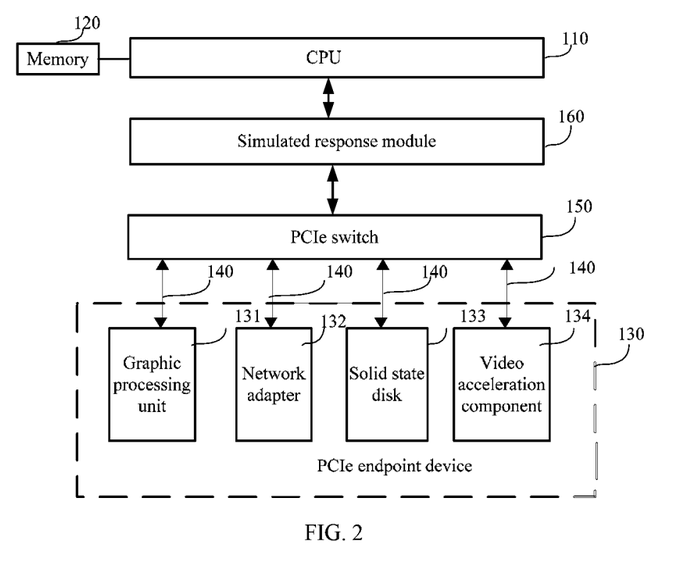
FIG. 2 is a composition diagram of another computer system according to an embodiment of the present invention.

As illustrated in FIG. 2, if multiple PCIe endpoint devices exist in the system, the multiple PCIe endpoint devices 130 may be connected to the CPU 110 through a PCIe switch 150. The system illustrated in FIG. 2 includes not only the components illustrated in FIG. 1, but also a PCIe switch 150. An upstream port of the PCIe switch 150 is connected to the CPU 110 through the PCIe bus 140, and a downstream port provides a PCIe port for each PCIe endpoint device. Each PCIe port is connected to each PCIe endpoint device through the PCIe bus 140. The PCIe switch 150 is configured to route data downstream to a corresponding PCIe port, and route the data upstream to the CPU 110 from each independent PCIe port. In FIG. 2, the simulation response module 160 may be set in a signal transmission path between the CPU 110 and the PCIe switch 150, and is configured to: receive the access request sent by the CPU 110, and buffer the access request sent by the CPU 110; forward the access request to the PCIe endpoint device 130, and monitor the message state of the access request; if determining that the response message for the access request is received from the PCIe endpoint device 130, affix a "finished" flag to the locally buffered access request, or delete the locally buffered access request; and when the preset trigger condition is fulfilled, query a buffered flag of the access request or the buffered access request; if the flag of the access request indicates that the access request is "unfinished" or if the buffered access request is not deleted, the simulation response module 160 determines that the PCIe endpoint device 130 sends no response message for the access request, and obtains the simulation response message for the access request, and sends the simulation response message to the CPU 110.

In the foregoing embodiment, the preset trigger condition may be that the simulation response module 160 determines that the PCIe endpoint device 130 goes offline abnormally. In this case, the simulation response module 160 is further configured to monitor whether the PCIe endpoint device goes offline abnormally. In the embodiments illustrated in FIG. 1 and FIG. 2, the simulation response module 160 determines whether a notification (such as an interruption notification indicating that the PCIe endpoint device is plugged out of the system) indicating that the PCIe endpoint device 130 goes offline abnormally is received, and determines that the PCIe endpoint device 130 goes offline abnormally according to the notification indicating that the PCIe endpoint device 130 goes offline abnormally. Alternatively, the preset trigger condition may be timeout of a timer of the access request. In this case, the simulation response module 160 is further configured to start a timer for the access request sent by the PCIe endpoint device 130, and upon timeout of the timer, determine whether the PCIe endpoint device 130 has sent the response message for the access request. In the embodiments illustrated in FIG. 1 and FIG. 2, the simulation response module 160 starts the timer for the access request after receiving the access request sent by the CPU 110 and buffering the access request.

In the embodiment of the present invention, the simulation response module monitors the message state of the access request; when the preset trigger condition is fulfilled, if the message state of the access request is still "unfinished", the simulation response module sends the simulation response message for the access request to the CPU, and therefore, the CPU stops timing for determining whether the procedure corresponding to the access request is complete, and clears the locally buffered access request, thereby keeping normal processing in the CPU and avoiding the MCE resetting problem that arises from timeout of processing the access requests in the CPU.

In all the foregoing embodiments, the simulation response message for the access request that is sent from the simulation response module 160 to the CPU 110 may include a first type simulation response message or a second type simulation response message. The first type simulation response message indicates that the PCIe endpoint device 130 does not support the access request, and the second type simulation response message indicates that the PCIe endpoint device 130 is abnormal. After receiving the simulation response message for the access request, the CPU 110 is further configured to determine, according to the first type simulation response message or the second type simulation response message, failure of accessing the PCIe endpoint device 130, and accordingly, give up any more operation of reading the data. In this embodiment, the type of the simulation response message is further clarified. Therefore, while confirming completion of the access procedure according to the simulation response message, the CPU can further confirm that the access is not successful, and accordingly, give up a next-step operation (for example, a read operation) of accessing the relevant data. Therefore, in a situation where the PCIe endpoint device goes offline abnormally, the embodiment of the present invention keeps normal processing of the CPU and prevents the CPU from performing unnecessary operations, thereby avoiding waste of system resources.

In another embodiment of the present invention, specifically, the CPU 110 may have more than one access request, for example, send multiple access requests, to the accessed PCIe endpoint device. In this case, the simulation response module 160 may monitor a message state of each of the multiple access requests sent by the CPU, for example, buffer each of the multiple access requests; monitor whether a response message for each access request is received; when the preset trigger condition is fulfilled, collect statistics for the number of access requests whose response message is not received, and obtain the number of access requests whose message state is "unfinished" among the multiple access requests, and if the number exceeds a first threshold, obtain simulation response messages for the access requests, and send the simulation response messages to the processor. In this embodiment, the CPU does not necessarily perform MCE resetting if only one access request lacks a received response message. In fact, the CPU has a tolerance, and does not perform the MCE resetting until the number of access requests without response messages accumulate to a certain value. Therefore, in this embodiment, the first threshold is set, and the simulation response module 160 does not send a simulation response message to the CPU until the number of access requests whose response message is not received exceeds the first threshold, thereby avoiding the MCE resetting of the CPU.

The simulation response module 160 may be implemented in the form of software or hardware, and in an embodiment of the present invention, may be implemented in the form of an FPGA (Field-Programmable Gate Array).

The CPU 110 in FIG. 1 and FIG. 2 is only an example. For example, the CPU may also be a specific integrated circuit. Regardless of the form of the CPU, the CPU implements functions of the processor in the computer system. The computer system in the embodiment of the present invention may be a computing-type server or a route management server such as a switch. The present invention does not limit the specific implementation form of the computer system.

PCIe Endpoint Device Accessing Procedure

Figure 3:
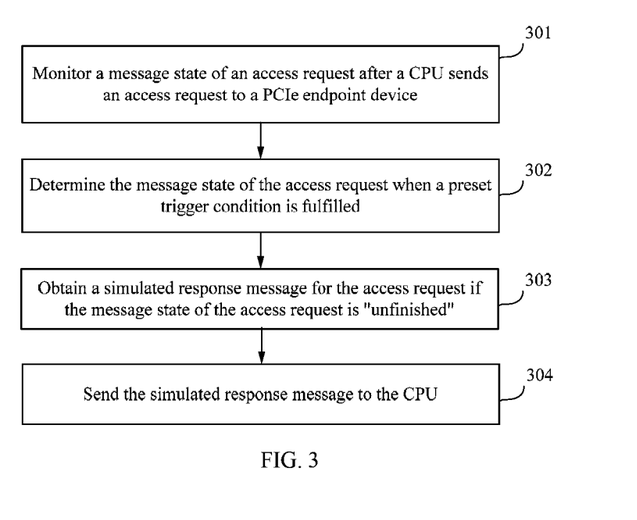
FIG. 3 is a method flowchart according to an embodiment of the present invention.

The following describes an embodiment of a PCIe endpoint device accessing procedure. FIG. 3 shows a PCIe endpoint device accessing procedure according to an embodiment of the present invention. The PCIe endpoint device accesses a computer system through a PCIe bus. The procedure includes:

S301: A simulation response module monitors a message state of an access request after a CPU in the computer system sends the access request to the PCIe endpoint device simulation response message.

Specifically, the message state of the access request includes "finished" or "unfinished", where "finished" indicates that the PCIe endpoint device has sent a response message for the access request, and "unfinished" indicates that the PCIe endpoint device sends no response message for the access request.

The simulation response module may monitor the message state of the access request by monitoring whether a response message for the access request is received from the PCIe endpoint device, and if the simulation response module receives a response message for the access request from the PCIe endpoint device, the simulation response module records the message state of the access request as "finished".

Further, the simulation response module may be set in a signal transmission path between the CPU and the PCIe endpoint device. In this way, the simulation response module can receive both the access request from the CPU and the response message for the access request from the PCIe endpoint device. The simulation response module may buffer the access request after receiving the access request. Subsequently, if receiving a response message for the access request, the simulation response module affixes a "finished" flag to the buffered access request, or deletes the buffered access request (in this case, the message state of the access request is flagged according to whether the access request is buffered, and if the access request is buffered, the message state of the access request is "unfinished", or if the buffered access request is deleted, the message state of the access request is "finished").

S302: The simulation response module determines the message state of the access request when a preset trigger condition is fulfilled.

The preset trigger condition may be timeout of a timer of the access request, or receiving of a notification indicating that the PCIe endpoint device goes offline abnormally. The implementation manner is detailed in subsequent embodiments.

S303. The simulation response module obtains a simulation response message for the access request if the message state of the access request is "unfinished".

S304. Send the simulation response message to the CPU.

Specifically, the simulation response module may obtain a simulation response message for the access request that is generated by the simulation response module itself. The simulation response message and the access request have the same message header, and the access request corresponds to the simulation response message. Therefore, the CPU considers the procedure corresponding to the previously sent access request as finished, shuts down a timer for timing the access request, and clears the access request buffered by the CPU, thereby keeping normal processing in the CPU and avoiding the MCE resetting problem of the CPU that arises from accumulation of access requests in the CPU.

The simulation response message for the access request in the embodiment of the present invention is not sent by the PCIe endpoint device, and is not a real response message for the access request, and may be generated by another module by means of simulation. In the embodiment of the present invention, the simulation response message for the access request may be generated by the simulation response module. The simulation response module may generate a simulation response message for the access request beforehand, or generate a simulation response message for the access request temporarily when it is determined that the message state of the access request is "unfinished".

In the embodiment of the present invention, the simulation response module monitors the message state of the access request; when the preset trigger condition is fulfilled, if the message state of the access request is still "unfinished", the simulation response module sends the simulation response message for the access request to the CPU, and therefore, the CPU stops timing for determining whether the procedure corresponding to the access request is complete, and clears the locally buffered access request, thereby keeping normal processing in the CPU and avoiding the MCE resetting problem that arises from timeout of processing the access requests in the CPU.

Figure 4:
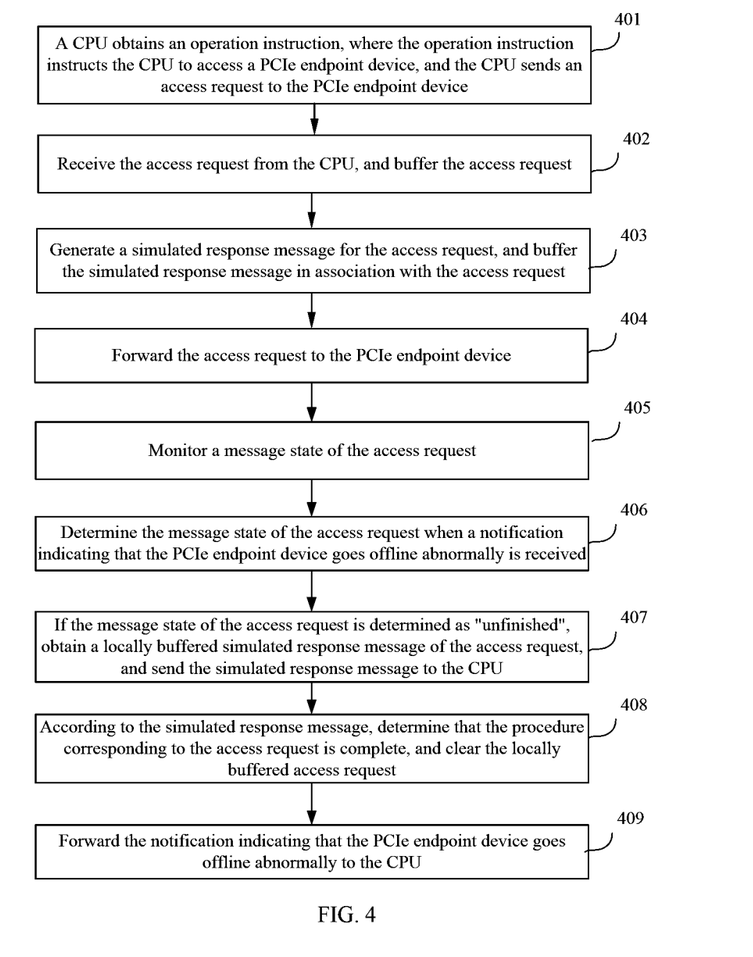
FIG. 4 is another method flowchart according to an embodiment of the present invention.

With reference to the computer system embodiment illustrated in FIG. 1 or FIG. 2, when the simulation response module is set in the signal transmission path between the CPU and the PCIe endpoint device, a specific access procedure in an embodiment of the present invention is illustrated in FIG. 4, including:

S401. The CPU in the computer system obtains an operation instruction, where the operation instruction instructs the CPU to access the PCIe endpoint device, and the CPU sends an access request to the PCIe endpoint device.

When an upstream endpoint generates a read operation requirement or a write operation requirement for the PCIe endpoint device, a driver module of the PCIe endpoint device is invoked by the upstream endpoint, and according to a preconfigured access interface, generates an operation instruction for accessing the PCIe endpoint device. The CPU obtains the operation instruction.

S402. The simulation response module receives the access request from the CPU, and buffers the access request.

The simulation response module is set in the signal transmission path between the CPU and the PCIe endpoint device, and therefore, can receive the access request from the CPU.

S403. The simulation response module generates a simulation response message for the access request, and buffers the simulation response message in association with the access request.

In step 403, the simulation response module may generate the simulation response message for the access request beforehand when buffering the access request, or generate the simulation response message in a subsequent step when the need of the simulation response message is determined.

S404. The simulation response module forwards the access request to the PCIe endpoint device.

S405. The simulation response module monitors a message state of the access request.

Specifically, the simulation response module monitors whether a response message for the access request is received from the PCIe endpoint device. If the simulation response module receives a response message for the access request from the PCIe endpoint device, the simulation response module affixes a "finished" flag to the buffered access request, or the simulation response module deletes the buffered access request.

The simulation response module may start the monitoring after step 404, that is, after the simulation response module forwards the access request to the PCIe endpoint device; or start the monitoring after step 401, that is, after the CPU sends the access request to the PCIe endpoint device.

S406. The simulation response module receives a notification indicating that the PCIe endpoint device goes offline abnormally, and determines the message state of the access request.

In this embodiment, the preset trigger condition is receiving of the notification indicating that the PCIe endpoint device goes offline abnormally. The simulation response module is set in the signal transmission path between the CPU and the PCIe endpoint device. Therefore, if the PCIe endpoint device is unplugged, the notification indicating that the PCIe endpoint device goes offline abnormally, which is transferred to the CPU, passes through the simulation response module. The simulation response module receives the notification indicating that the PCIe endpoint device goes offline abnormally, determines that the preset trigger condition is fulfilled, queries the message state of the access request, and determines the message state.

S407. If the simulation response module determines that the message state of the access request is "unfinished", the simulation response module obtains the locally buffered simulation response message for the access request, and sends the simulation response message to the CPU.

In this embodiment, the simulation response message may be a first type simulation response message indicating that the PCIe endpoint device 130 does not support the access request, for example, the simulation response message carries an Unsupported Request (UR) indication; or, the simulation response message may be a second type simulation response message indicating that the PCIe endpoint device 130 is abnormal, for example, the simulation response message carries a Completer Abort (CA) indication.

S408. The CPU receives the simulation response message, and according to the simulation response message, determines that the procedure corresponding to the access request is complete, and clears the locally buffered access request.

The simulation response message and the access request have the same message header, and the access request corresponds to the simulation response message. Therefore, the CPU considers the procedure corresponding to the previously sent access request as finished, shuts down the timer for timing the access request, and clears the access request buffered by the CPU, thereby keeping normal processing in the CPU and avoiding the MCE resetting problem of the CPU that arises from accumulation of the access requests in the CPU.

Further, because the simulation response message may further carry a UR or CA indication, the simulation response module may further determine, according to indication information carried in the simulation response message, failure of accessing the PCIe endpoint device and handle an access error. The handling of the access error may include: suppressing the CPU from performing further relevant operations (such as data reading) for the access request, or recording the state of the PCIe endpoint device as abnormal offline, thereby stopping the CPU from subsequently accessing the PCIe endpoint device.

S409. The simulation response module forwards the notification indicating that the PCIe endpoint device goes offline abnormally to the CPU.

Subsequently, according to the notification indicating that the PCIe endpoint device goes offline abnormally, the CPU may power off a physical device corresponding to the PCIe endpoint device, and perform an operation of releasing relevant resources.

In the embodiment of the present invention, the simulation response module monitors the message state of the access request; when receiving the notification indicating that the accessed PCIe endpoint device goes offline abnormally, if the message state of the access request is still "unfinished", the simulation response module sends the simulation response message for the access request to the CPU, and therefore, the CPU gives up timeout timing for determining whether the procedure corresponding to the access request is complete, thereby keeping normal processing in the CPU and avoiding the MCE resetting problem that arises from timeout of processing the access requests in the CPU. In the embodiment of the present invention, in the signal transmission path between the CPU and the PCIe endpoint device, the simulation response module can monitor the message state of the access request according to whether the response message for the access request is received from the accessed PCIe endpoint device. The implementation is convenient and flexible and highly efficient.

In addition, in this embodiment, the type of the simulation response message is further clarified. Therefore, while confirming completion of the access procedure according to the simulation response message, the CPU can further confirm that the access is not successful, and accordingly, give up a next-step operation (for example, a read operation) of accessing the relevant data. Therefore, in a situation where the PCIe endpoint device goes offline abnormally, the embodiment of the present invention keeps normal processing of the CPU and prevents the CPU from performing unnecessary operations, thereby avoiding waste of system resources.

Figure 5:
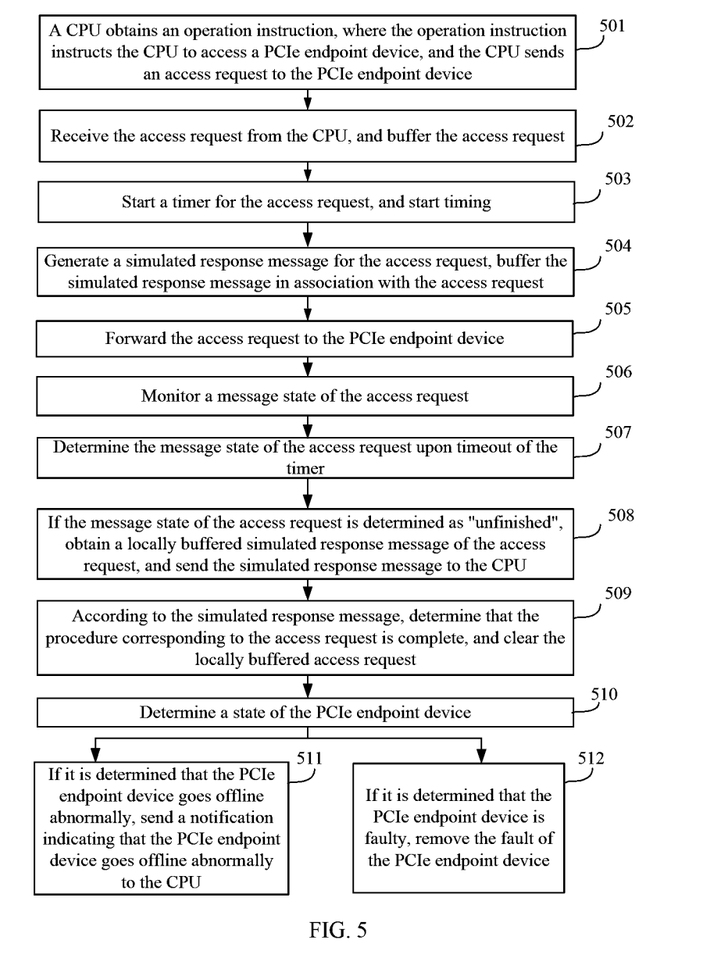
FIG. 5 is another method flowchart according to an embodiment of the present invention.

In a second method embodiment of the present invention, the simulation response module is still set in the signal transmission path between the CPU and the PCIe endpoint device. As illustrated in FIG. 5, the method includes:

S501. The CPU in the computer system obtains an operation instruction, where the operation instruction instructs the CPU to access the PCIe endpoint device, and the CPU sends an access request to the PCIe endpoint device.

S502. The simulation response module receives the access request from the CPU, and buffers the access request.

The simulation response module is set in the signal transmission path between the CPU and the PCIe endpoint device, and therefore, can receive the access request from the CPU.

S503. The simulation response module starts a timer for the access request, and starts timing.

S504. The simulation response module generates a simulation response message for the access request, and buffers the simulation response message in association with the access request.

In step 503, the simulation response module may generate the simulation response message for the access request beforehand when buffering the access request, or generate the simulation response message in a subsequent step when the need of the simulation response message is determined.

The implementation order between step 503 and step 504 is not fixed. The simulation response module may perform steps 503 and 504 simultaneously after receiving the access request, or perform step 503 before performing step 504.

S505. The simulation response module forwards the access request to the PCIe endpoint device.

S506. The simulation response module monitors a message state of the access request.

Specifically, the simulation response module monitors whether a response message for the access request is received from the PCIe endpoint device. If the simulation response module receives a response message for the access request from the PCIe endpoint device, the simulation response module affixes a "finished" flag to the buffered access request, or the simulation response module deletes the buffered access request.

S507. The simulation response module determines the message state of the access request upon timeout of the timer.

In this embodiment, the preset trigger condition is timeout of the timer of the access request. The timeout time of the timer is set according to an empiric value, and the empiric value is a maximum tolerable time for the PCIe endpoint device to send the response message for the access request. Generally, if the PCIe endpoint device stays normal, the simulation response module can surely receive the response message for the access request from the PCIe endpoint device within the time of the empiric value.

S508. If the simulation response module determines that the message state of the access request is "unfinished", the simulation response module obtains the locally buffered simulation response message for the access request, and sends the simulation response message to the CPU.

Upon timeout of the timer, the simulation response module queries the message state of the access request; if the message state is determined as "unfinished", it can be basically determined that the accessed PCIe endpoint device goes offline abnormally, and it is not possible for the CPU to receive the response message for the access request. In this case, to avoid the MCE resetting problem that arises from timeout of the access request buffered by the CPU, the simulation response module sends the simulation response message generated beforehand to the CPU.

In this embodiment, the simulation response message may be a first type simulation response message indicating that the PCIe endpoint device 130 does not support the access request, for example, the simulation response message carries an Unsupported Request (UR) indication; or, the simulation response message may be a second type simulation response message indicating that the PCIe endpoint device 130 is abnormal, for example, the simulation response message carries a Completer Abort (CA) indication.

S509. The CPU receives the simulation response message, and according to the simulation response message, determines that the procedure corresponding to the access request is complete, and clears the locally buffered access request.

The simulation response message and the access request have the same message header, and the access request corresponds to the simulation response message. Therefore, the CPU considers the procedure corresponding to the previously sent access request as finished, shuts down the timer for timing the access request, and clears the access request buffered by the CPU, thereby keeping normal processing in the CPU and avoiding the MCE resetting problem of the CPU that arises from accumulation of the access requests in the CPU.

Further, because the simulation response message may further carry a UR or CA indication, the simulation response module may further handle an access error according to indication information carried in the simulation response message. The handling of the access error may include: suppressing the CPU from performing further relevant operations (such as data reading) for the access request, or recording the state of the PCIe endpoint device as abnormal offline, thereby stopping the CPU from subsequently accessing the PCIe endpoint device.

S510. The simulation response module determines the state of the PCIe endpoint device.

The simulation response module further determines whether the state of the PCIe endpoint device is "abnormal offline" or "faulty". If the PCIe endpoint device goes offline abnormally, perform step 511; or if the PCIe endpoint device is faulty, step 512 is performed.

The simulation response module may determine whether a notification indicating that the PCIe endpoint device goes offline abnormally is received. Whether the PCIe endpoint device goes offline abnormally may be determined according to whether the notification is received. The simulation response module may also send a probe message to the PCIe endpoint device to determine a state of the PCIe endpoint device.

S511. If determining that the PCIe endpoint device goes offline abnormally, the simulation response module sends a notification indicating that the PCIe endpoint device goes offline abnormally to the CPU, so that according to the notification indicating that the PCIe endpoint device goes offline abnormally, the CPU powers off a physical device corresponding to the PCIe endpoint device and performs an operation of releasing resources.

S512. If determining that the PCIe endpoint device is faulty, the simulation response module removes the fault of the PCIe endpoint device.

In the embodiment of the present invention, the simulation response module monitors the message state of the access request; upon timeout of the timer, if the message state of the access request is still "unfinished", the simulation response module sends the simulation response message for the access request to the CPU, and therefore, the CPU gives up timeout timing for determining whether the procedure corresponding to the access request is complete, thereby keeping normal processing in the CPU and avoiding the MCE resetting problem that arises from timeout of processing the access requests in the CPU.

In addition, in this embodiment, the type of the simulation response message is further clarified. Therefore, while confirming completion of the access procedure according to the simulation response message, the CPU can further confirm that the access is not successful, and accordingly, give up a next-step operation (for example, a read operation) of accessing the relevant data. Therefore, in a situation where the PCIe endpoint device goes offline abnormally, the embodiment of the present invention keeps normal processing of the CPU and prevents the CPU from performing unnecessary operations, thereby avoiding waste of system resources.

Apparatus Embodiments of the Present Invention

Figure 6:
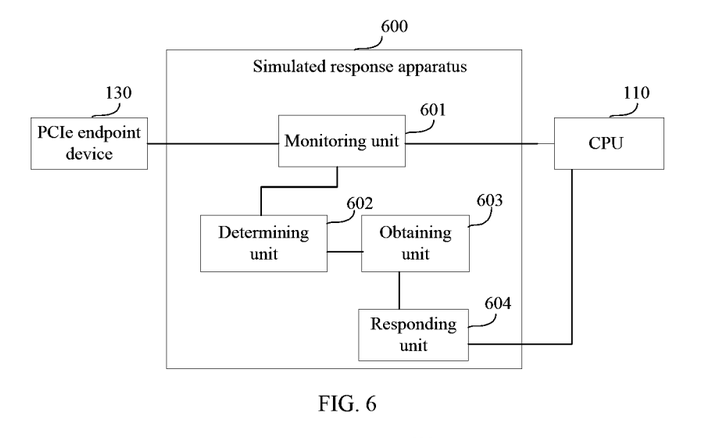
FIG. 6 is a composition diagram of a simulation response apparatus according to an embodiment of the present invention.

A simulation response apparatus provided in an embodiment of the present invention is applied in a computer system, where a PCIe endpoint device accesses the computer system through a PCIe bus. As illustrated in FIG. 6, the apparatus interacts with the PCIe endpoint device 130 and a CPU 110, and the apparatus includes:

a monitoring unit 601, configured to monitor a message state of an access request after a CPU 110 in the computer system sends the access request to the PCIe endpoint device, where the message state of the access request includes "finished" or "unfinished", where "unfinished" indicates that the PCIe endpoint device sends no response message for the access request;

a determining unit 602, configured to determine the message state of the access request according to a monitoring result of the monitoring unit 601 when a preset trigger condition is fulfilled;

an obtaining unit 603, configured to obtain a simulation response message for the access request if the determining unit 602 determines that the message state of the access request is "unfinished"; and a responding unit 604, configured to send the simulation response message obtained by the obtaining unit 603 to the CPU 110.

Figure 7:
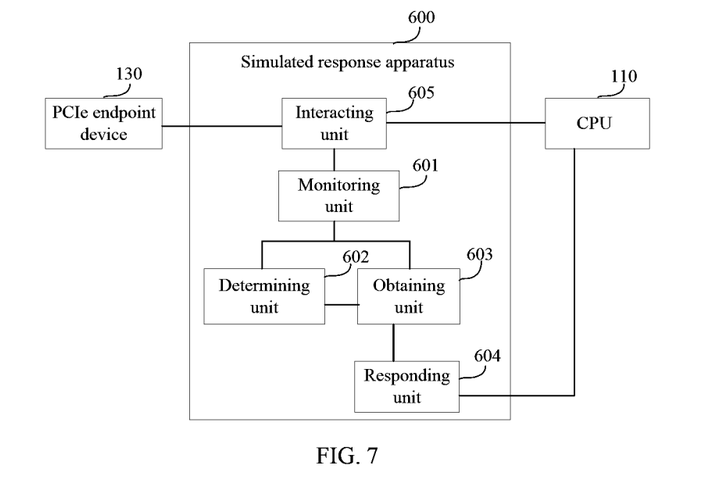
FIG. 7 is a composition diagram of another simulation response apparatus according to an embodiment of the present invention.

Further, in another apparatus embodiment of the present invention, as illustrated in FIG. 7, the apparatus further includes:

an interacting unit 605, configured to receive the access request sent by the CPU 110, and forward the access request to the PCIe endpoint device 130; where the monitoring unit 601 is specifically configured to monitor whether the interacting unit 605 receives a response message for the access request sent by the PCIe endpoint device, and if a response message for the access request is received from the PCIe endpoint device, record the message state of the access request as "finished".

Further, in another apparatus embodiment of the present invention, the monitoring unit 601 is further configured to buffer the access request received by the interacting unit 605;

the monitoring unit 601 is specifically configured to: when the interacting unit 605 receives the response message for the access request sent by the PCIe endpoint device, affix a "finished" flag to the buffered access request, or delete the buffered access request; and the determining unit 602 is specifically configured to: when the preset trigger condition is fulfilled, query the access request buffered by the monitoring unit 601; if a flag of the buffered access request is "finished" or the buffered access request is deleted, determine that the message state of the access request is "finished", or if a flag of the buffered access request is "unfinished" or the buffered access request has no "finished" flag, determine that the message state of the access request is "unfinished".

Further, in another apparatus embodiment of the present invention, the monitoring unit 601 is further configured to: after the interacting unit 605 receives the access request sent by the CPU 110, generate a simulation response message for the access request, and buffer the simulation response message for the access request; and the obtaining unit 603 is specifically configured to obtain the simulation response message for the access request that is buffered by the monitoring unit 601.

Further, in another apparatus embodiment of the present invention, the simulation response message for the access request includes a first type simulation response message or a second type simulation response message, where the first type simulation response message indicates that the PCIe endpoint device does not support the access request, and the second type simulation response message indicates that the PCIe endpoint device is abnormal.

Further, in another apparatus embodiment of the present invention, the preset trigger condition is that the PCIe endpoint device goes offline abnormally; and the monitoring unit 601 is further configured to monitor whether the PCIe endpoint device goes offline abnormally, and when it is determined that the PCIe endpoint device goes offline abnormally, notify the determining unit 602 to perform the step of determining the message state of the access request.

Further, in another apparatus embodiment of the present invention, the monitoring unit 601 is specifically configured to determine whether the interacting unit 605 receives a notification indicating that the PCIe endpoint device goes offline abnormally, and if the notification is received, determine that the PCIe endpoint device goes offline abnormally.

Further, in another apparatus embodiment of the present invention, the interacting unit 605 is further configured to:

forward the notification indicating that the PCIe endpoint device goes offline abnormally to the CPU 110, so that according to the received notification indicating that the PCIe endpoint device 130 goes offline abnormally, the CPU 110 powers off a physical device corresponding to the PCIe endpoint device 130.

Further, in another apparatus embodiment of the present invention, the preset trigger condition is timeout of a timer of the access request; and the monitoring unit 601 is further configured to:

start a timer to time the access request sent by the CPU 110, and upon timeout of the timer, notify the determining unit 602 to perform the step of determining the message state of the access request.

The monitoring unit 601 is further configured to:

determine a state of the PCIe endpoint device; if the state of the PCIe endpoint device is determined as abnormal offline, notify the interacting unit 605 to send a notification indicating that the PCIe endpoint device 130 goes offline abnormally to the CPU 110, so that according to the received notification indicating that the PCIe endpoint device 130 goes offline abnormally, the CPU 110 powers off a physical device corresponding to the PCIe endpoint device 130.

Further, in another apparatus embodiment of the present invention, the CPU 110 sends multiple access requests to the PCIe endpoint device 130;

the monitoring unit 601 is specifically configured to monitor a message state of each of the multiple access requests;

the determining unit 602 is specifically configured to: when the preset trigger condition is fulfilled, collect statistics for the number of access requests whose response message is not received among the multiple access requests, and determine whether the number exceeds a first threshold; and the obtaining unit 603 is specifically configured to: when the number exceeds the first threshold, obtain simulation response messages for the access requests.

Figure 8:
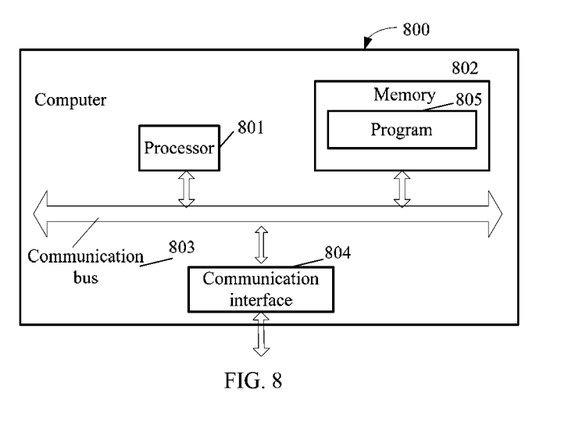
FIG. 8 is a composition diagram of a computer according to an embodiment of the present invention.

FIG. 8 is a composition diagram of composition of a computer according to an embodiment of the present invention. The computer in the embodiment of the present invention may include:

a processor 801, a memory 802, a system bus 804, and a communication interface 805, where the processor 801, the memory 802, and the communication interface 805 are interconnected through the system bus 804, and communicate with each other.

The processor 801 may be a single-core or multi-core central processing unit, or a specific integrated circuit, or one or more integrated circuits configured for implementing the embodiment of the present invention.

The memory 802 may be a high-speed RAM memory, or a non-volatile memory (non-volatile memory), for example, at least one disk memory.

The memory 802 is configured to store computer-executable instructions 803. Specifically, the computer-executable instructions 803 may include program codes.

When the computer runs, the processor 801 runs the computer-executable instructions 803, and can execute the method procedure illustrated in any one of FIG. 3 to FIG. 5, the details of which are not repeated here any further.

A person of ordinary skill in the art will understand that, each aspect of the present invention or any possible implementation manner of each aspect may be implemented in the form of a system, a method, or a computer program product. Therefore, each aspect of the present invention or any possible implementation manner of each aspect may be in the form of fully a hardware embodiment, or fully a software embodiment (including firmware, residing software, and so on), or a combination of software and hardware embodiments, which are uniformly called "circuit", "module" or "system" herein. Furthermore, each aspect of the present invention or any possible implementation manner of each aspect may be in the form of a computer program product, where the computer program product refers to computer-readable program codes stored on a computer-readable medium.

The computer-readable medium may be a computer-readable signal medium or a computer-readable storage medium. The computer-readable storage medium includes but is not limited to electronic, magnetic, optical, electromagnetic, infrared, or semiconductor systems, devices or apparatuses, or any appropriate combination thereof, such as a random access memory (RAM), a read only memory (ROM), an erasable programmable read-only memory (EPROM or flash memory), an optical fiber, and a portable read-only memory (CD-ROM).

A processor in the computer reads computer-readable program codes stored in the computer-readable medium. Therefore, the processor can perform function actions specified in each step or a combination of the steps in the flowchart, and an apparatus for performing function actions specified in each block or in a combination of the blocks of the block diagram can be generated.

The computer-readable program codes may be fully executed on a computer of a user, or partly executed on the computer of the user, or executed as a separate software package, or partly executed on the computer of the user and partly executed on a remote computer, or fully executed on a remote computer or server. It should also be noted that, in some alternative solutions, the steps in the flowchart or the functions specified in each block of the block diagram may occur in a different order instead of the order specified in the figures. For example, depending on the functions involved, two steps are illustrated successively, or two blocks may be actually executed almost at the same time, or the blocks may sometimes be executed in the reverse order.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A computer, comprising:
   a processor, configured to obtain an operation instruction for accessing a peripheral component interconnect express (PCIe) endpoint device, and send an access request to the PCIe endpoint device according to the operation instruction;
   a PCIe bus, configured to connect to the PCIe endpoint device;
   a simulation response module implemented in a field-programmable gate array (FPGA) and, configured to monitor a state of the access request, wherein the state of the access request comprises finished or unfinished, and if the state of the access request is unfinished when a preset trigger condition is fulfilled, obtain a simulation response message for the access request, and send the simulation response message to the processor;
   wherein the simulation response module receives the access request sent by the processor, buffers the access request after receiving the access request, monitors whether a response message for the access request is received from the PCIe endpoint device, and if the response message for the access request is received from the PCIe endpoint device, affixes a finished flag to the buffered access request or deletes the buffered access request; and wherein the simulation response module queries the buffered access request when the preset trigger condition is fulfilled, determines that the state of the access request is finished if a flag of the buffered access request is finished or the buffered access request is deleted, and determines that the state of the access request is unfinished if a flag of the buffered access request is unfinished or the buffered access request has no flag indicating the state is finished.

2. The computer according to claim 1, wherein the simulation response module is set in a signal transmission path between the processor and the PCIe endpoint device.

3. The computer according to claim 1, wherein the simulation response module is further configured to generate the simulation response message for the access request, and buffer the simulation response message for the access request, and obtain the buffered simulation response message for the access request if the state of the access request is determined as unfinished.

4. The computer according to claim 1, wherein the simulation response message for the access request comprises a first type simulation response message or a second type simulation response message, wherein the first type simulation response message indicates that the PCIe endpoint device does not support the access request, and the second type simulation response message indicates that the PCIe endpoint device is abnormal; and the processor is further configured to abort a subsequent access to the PCIe endpoint device according to the first type simulation response message or the second type simulation response message.

5. The computer according to claim 1, wherein the simulation response module is implemented in a form of a field-programmable gate array.

6. The computer according to claim 1, wherein the preset trigger condition is that the PCIe endpoint device goes offline; and the simulation response module is configured to monitor whether the PCIe endpoint device goes offline, and determine the state of the access request when it is determined that the PCIe endpoint device goes offline.

7. The computer according to claim 6, wherein the simulation response module is configured to determine whether a notification indicating that the PCIe endpoint device goes offline is received, and determine that the PCIe endpoint device goes offline if the notification is received.

8. The computer according to claim 7, wherein the simulation response module is further configured to forward the notification indicating that the PCIe endpoint device goes offline to the processor; and the processor is configured to power off a physical device corresponding to the PCIe endpoint device according to the received notification indicating that the PCIe endpoint device goes offline.

9. The computer according to claim 1, wherein the preset trigger condition is timeout of a timer of the access request; and the simulation response module is configured to start the timer to time the access request sent by the processor, and determine the state of the access request upon timeout of the timer.

10. The computer according to claim 9, wherein after sending the simulation response message to the processor, the simulation response module is configured to determine a state of the PCIe endpoint device, and send a notification indicating that the PCIe endpoint device goes offline to the processor if the state of the PCIe endpoint device is offline; and the processor is configured to power off a physical device corresponding to the PCIe endpoint device according to the received notification indicating that the PCIe endpoint device goes offline.

11. The computer according to claim 1, wherein the processor is configured to send multiple access requests to the PCIe endpoint device; and the simulation response module is configured to buffer the multiple access requests, monitor a state of each of the multiple access requests, collect statistics for a quantity of access requests whose response messages are not received among the multiple access requests when the preset trigger condition is fulfilled, and if the quantity exceeds a threshold, obtain one simulation response message for each of the access requests whose response messages are not received, and send the obtained simulation response message to the processor.

* * * * *